(12) United States Patent
Fujimoto

(10) Patent No.: US 11,555,575 B2
(45) Date of Patent: Jan. 17, 2023

(54) OPERATING DEVICE, DISPLAY CONTROL METHOD, AND RECORDING MEDIUM RECORDING DISPLAY CONTROL PROGRAM

(71) Applicant: SHARP KABUSHIKI KAISHA, Sakai (JP)

(72) Inventor: Hidetoshi Fujimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/220,278

(22) Filed: Apr. 1, 2021

(65) Prior Publication Data

US 2021/0310602 A1 Oct. 7, 2021

(30) Foreign Application Priority Data

Apr. 7, 2020 (JP) .............................. JP2020-068983

(51) Int. Cl.
| | |
|---|---|
| *G09G 3/20* | (2006.01) |
| *F16M 11/10* | (2006.01) |
| *F16M 11/18* | (2006.01) |
| *G06F 3/0346* | (2013.01) |
| *F16M 11/20* | (2006.01) |

(52) U.S. Cl.
CPC .......... *F16M 11/105* (2013.01); *F16M 11/18* (2013.01); *G06F 3/0346* (2013.01); *G09G 3/20* (2013.01); *F16M 11/2021* (2013.01); *G09G 2340/0464* (2013.01); *G09G 2354/00* (2013.01); *G09G 2356/00* (2013.01); *G09G 2370/06* (2013.01)

(58) Field of Classification Search
CPC ......... G06F 3/0346; G06F 3/017; G09G 3/20; G09G 2340/0464; G09G 2354/00; G09G 2356/00; G09G 2370/06; F16M 11/2021; F16M 11/105; F16M 11/18; G06K 9/00375

See application file for complete search history.

(56) References Cited

U.S. PATENT DOCUMENTS

| | | | | |
|---|---|---|---|---|
| 2010/0066751 | A1* | 3/2010 | Ryu | G06F 1/1626 345/581 |
| 2010/0066763 | A1* | 3/2010 | MacDougall | G06F 1/1626 345/656 |
| 2013/0169687 | A1* | 7/2013 | Williamson | G06T 11/60 345/656 |
| 2013/0265217 | A1 | 10/2013 | Sakaguchi et al. | |

FOREIGN PATENT DOCUMENTS

JP 2013-214252 A 10/2013

\* cited by examiner

*Primary Examiner* — Yuzhen Shen
(74) *Attorney, Agent, or Firm* — ScienBiziP, P.C.

(57) ABSTRACT

An operating device according to the present invention includes a posture setter that sets a posture of the operating device with respect to a user to a first posture, a display processor that causes a predetermined object to be displayed toward a first direction in the display area of the operating device set to the first posture, a posture detector that detects a posture change of the operating device when the user changes the posture of the operating device, and a display changer that causes at least a part of object information included in the object to be displayed toward the first direction in the display area when the operating device changes the posture from the first posture to a second posture.

11 Claims, 12 Drawing Sheets

FRONT DIRECTION

FRONT DIRECTION

FRONT DIRECTION

FRONT DIRECTION

FRONT DIRECTION

FRONT DIRECTION

FRONT DIRECTION

FRONT DIRECTION

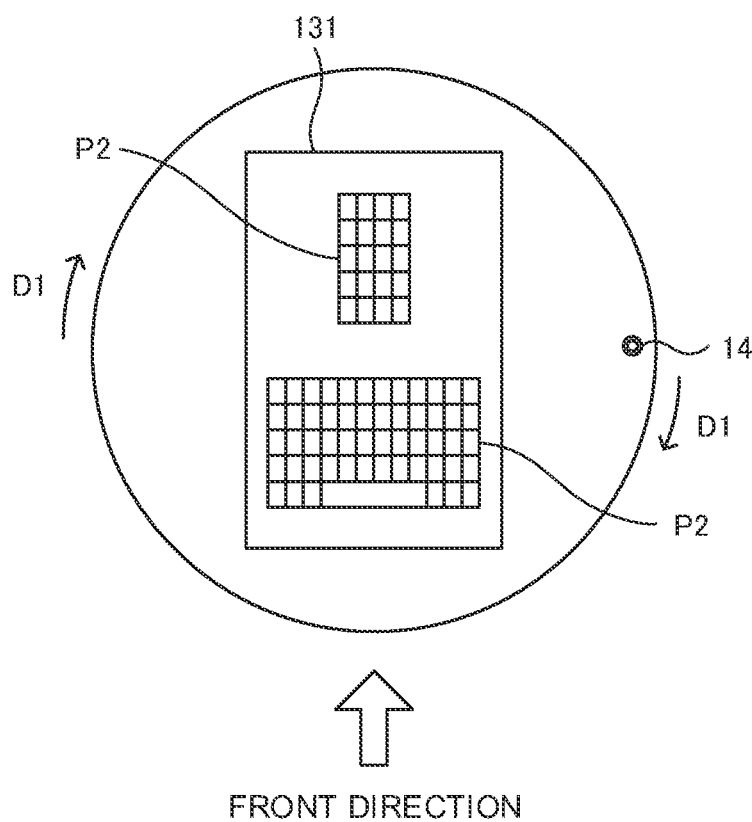

OPERATING DEVICE, DISPLAY CONTROL METHOD, AND RECORDING MEDIUM RECORDING DISPLAY CONTROL PROGRAM

INCORPORATION BY REFERENCE

This application is based upon and claims the benefit of priority from the corresponding Japanese Patent Applications No. 2020-068983 filed on Apr. 7, 2020, the entire contents of which are incorporated herein by reference.

BACKGROUND

Field of the Invention

The present invention relates to an operating device, a display control method, and a recording medium recording a display control program.

Description of the Background Art

Conventionally, a display image displayed on the display device is displayed by a user holding an operating device such as a controller to change the posture such as a position and inclination of the operating device (movement, rotation, etc.). A system has been proposed that can change the display state of the above display image to a state corresponding to a posture change of the operating device (see, for example, Japanese Patent Application Publication 2013-214252 2013-214252).

Here, for example, an operating device capable of displaying a function icon (object) for causing a predetermined process to be executed to a display image on its own display has been known. According to this operating device, for example, a user can rotate the display image displayed on a display device by rotating the operating device and also can operate the function icon of the operating device to cause a predetermined process to be executed to the display image.

However, in the conventional operating device, for example, when the user rotates the operating device, the position of the function icon seen by the user also rotates with the rotation. Therefore, each time the user changes a posture of the operating device, the position of the function icon as seen by the user changes, which causes a problem that the visibility of the function icon deteriorates.

SUMMARY

An object of the present invention is to provide an operating device that executes a predetermined process in response to a user, s operation and is capable of improving the visibility of an object displayed on the operating device, a display control method, and a non-temporary computer-readable recording medium that records a display control program.

The operating device according to one aspect of the present invention is an operating device that includes a display including a predetermined display area and executing a predetermined process in response to a user's operation and includes a posture setter that sets a posture of the operating device with respect to the user to a first posture, a display processor that displays a predetermined object toward a first direction in the display area of the operating device set to the first posture, a posture detector that detects a posture change of the operating device when the user changes the posture of the operating device, and a display changer that displays at least apart of object information included in the object in the display area toward the first direction when the operating device changes the posture from the first posture to a second posture.

The display control method according to another embodiment of the present invention is a display control method for displaying an image in a display area included in a display of an operating device that executes a predetermined process in response to a user, s operation and is a method for executing, by one or a plurality of processors, posture setting of setting a posture of the operating device with respect to the user to a first posture, causing to display a predetermined object toward a first direction in the display area of the operating device set to the first posture, posture detecting of detecting a posture change of the operating device when the user changes the posture of the operating device, and display changing of causing to display at least apart of object information included in the object toward the first direction in the display area when the operating device changes the posture from the first posture to a second posture.

The non-temporary computer-readable recording medium that records a display control program according to another embodiment of the present invention is a non-temporary computer-readable recording medium that records a display control program that causes an image to be displayed in a display area included in a display of an operating device that executes a predetermined process in response to a user, s operation and is a non-temporary computer-readable recording medium that records a display control program that causes one or a plurality of processors to execute posture setting of setting a posture of the operating device with respect to the user to a first posture, causing to display a predetermined object toward a first direction in the display area of the operating device set to the first posture, posture detecting of detecting a posture change of the operating device when the user changes the posture of the operating device, and display changing of causing to display at least a part of object information included in the object toward the first direction in the display area when the operating device changes the posture from the first posture to a second posture.

According to the present invention, an operating device that executes a predetermined process in response to a user's operation and can improve the visibility of an object displayed on the operating device, a display control method, and a non-temporary computer-readable recording medium that records a display control program are provided.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7C is a diagram illustrating an example of an image displayed on the operating device according to the embodiment of the present invention.

DETAILED DESCRIPTION

An embodiment of the present invention will be described below with reference to the accompanying drawings to facilitate understanding of the present invention. It is noted that the following embodiment is an example in which the present invention is embodied, and does not limit the technical scope of the present invention.

Display Control System 100

Figure 1:
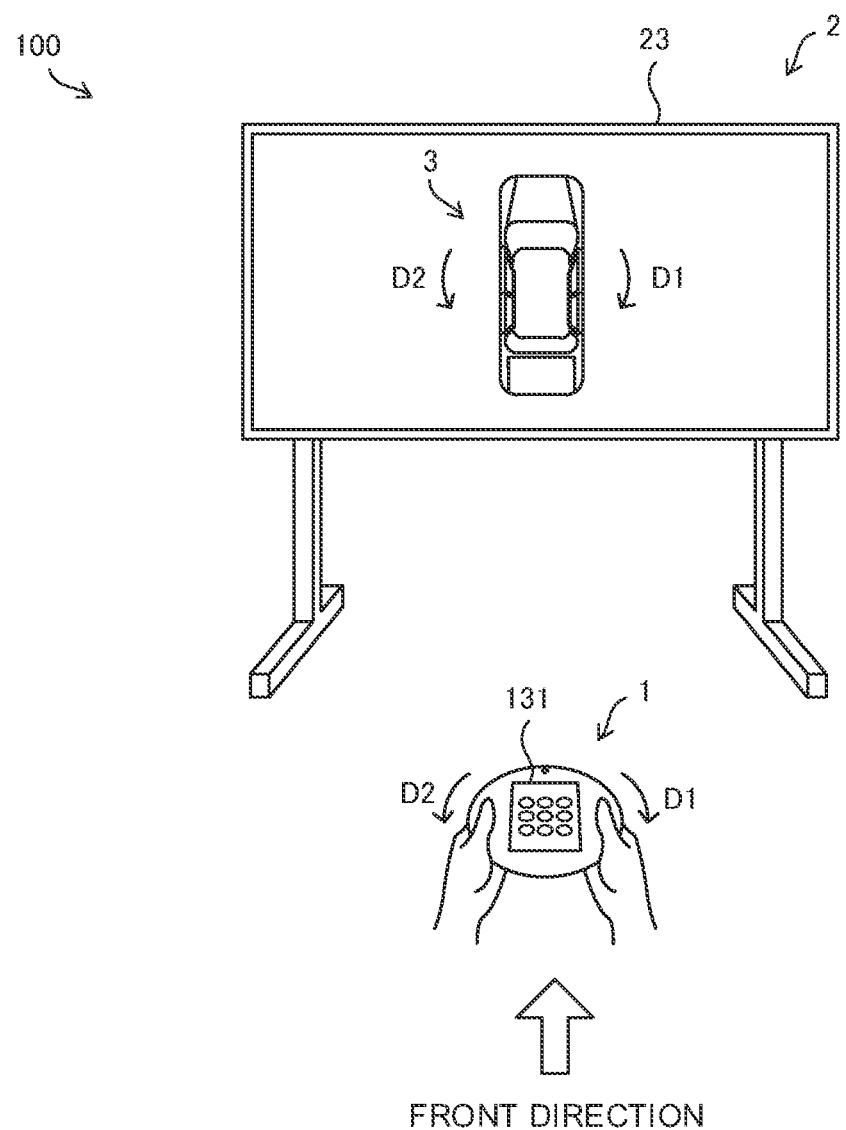
FIG. 1 is a schematic diagram illustrating configuration of a display control system according to an embodiment of the present invention.
Figure 2:
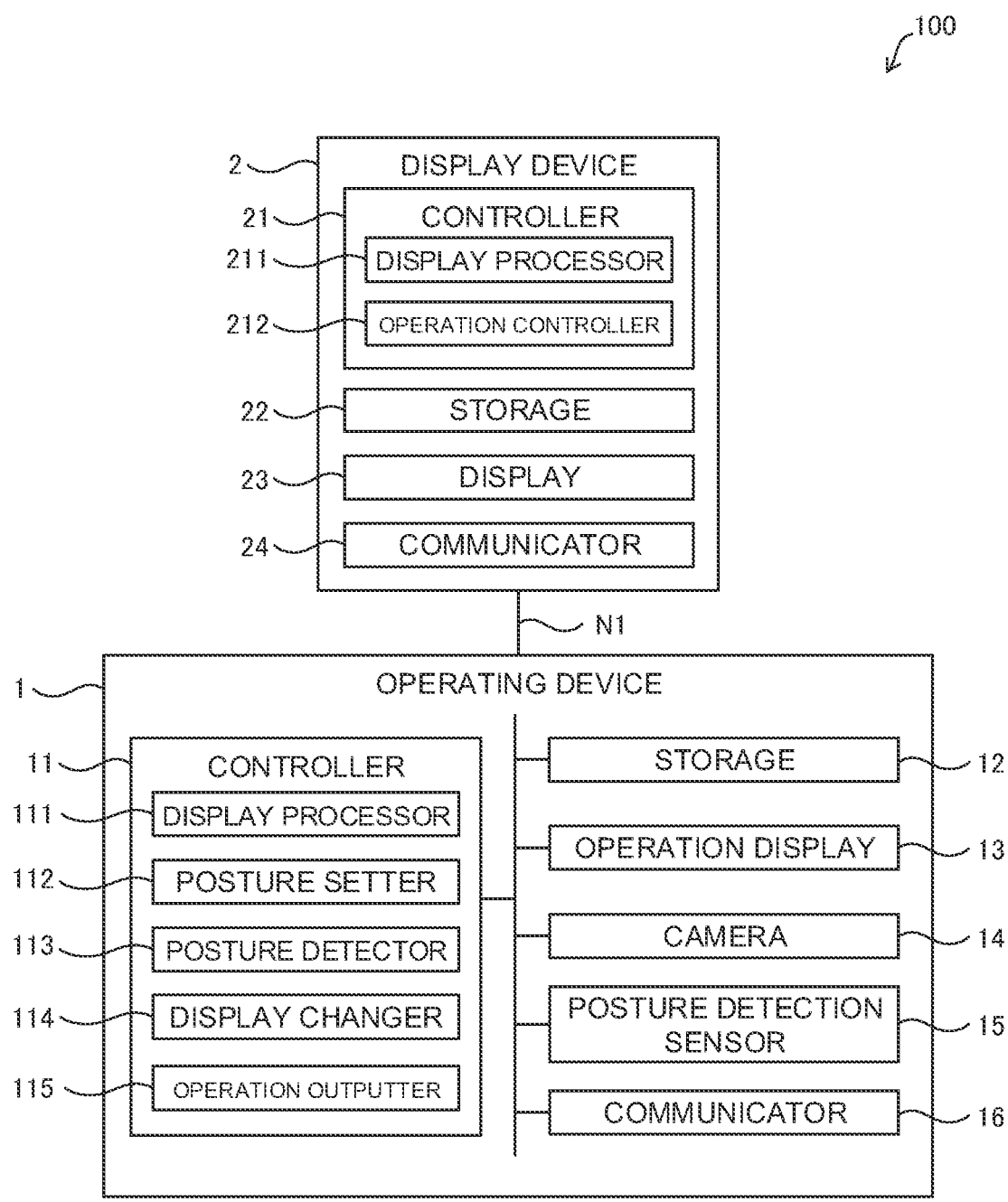
FIG. 2 is a block diagram illustrating configuration of the display control system according to the embodiment of the present invention.

As shown in FIGS. 1 and 2, the display control system 100 according to the embodiment of the present invention includes an operating device 1 and a display device 2. The operating device 1 and the display device 2 can communicate with each other via a communication network N1 such as a wireless LAN or a wired LAN. The operating device 1 is an example of the operating device of the present invention, and the display device 2 is an example of the display device of the present invention.

The operating device 1 is a controller that executes a predetermined process in accordance with a user's operation. For example, as shown in FIG. 1, when the user grips the operating device 1 and rotates it in a D1 direction, the operating device 1 rotates an operation target image 3 displayed on the display device 2 in the D1 direction in accordance with the user's operation. Further, for example, when the user grips the operating device 1 and rotates it in a D2 direction, the operating device 1 rotates the operation target image 3 in the D2 direction in accordance with the user's operation. Further, for example, when the user tilts the operating device 1 in a front-rear direction or in a left-right direction, the operating device 1 tilts the operation target image 3 in a direction corresponding to the user's operation. As described above, the operating device 1 is a controller capable of operating the operation target image 3 displayed on the display device 2 in accordance with the user, s operation. The operation target image 3 is an example of an operation target of the present invention. That is, in the present embodiment, the operation target is the operation target image 3 displayed on the display device 2 communicably connected to the operating device 1.

Further, the operating device 1 includes an operation display 13 including a predetermined display area 131. The operating device 1 displays a predetermined object (corresponding to the object of the present invention) in the display area 131. The object is, for example, a function icon (hereinafter referred to as a function icon P1 (see FIG. 3A)) for causing a predetermined process to be executed to the operation target image 3. By selecting the function icon P1 while moving the operating device 1, the user can cause a predetermined process to be executed while changing the posture of the operation target image 3 on the display device 2. For example, when the user selects the function icon P1 for designating a color, the operating device 1 causes a display color of the operation target image 3 to be changed to the color designated by the user. The number of function icons P1 displayed in the display area 131 may be one or a plurality. A predetermined process is assigned to each function icon P1 and set. When there are a plurality of function icons P1, the plurality of function icons P1 are arranged in a predetermined direction. For example, in the example shown in FIG. 1, nine function icons P1 are displayed in a 3×3 array in the row direction and the column direction.

Hereinafter, specific configuration of the operating device 1 will be described.

Operating Device 1

Figure 3A:
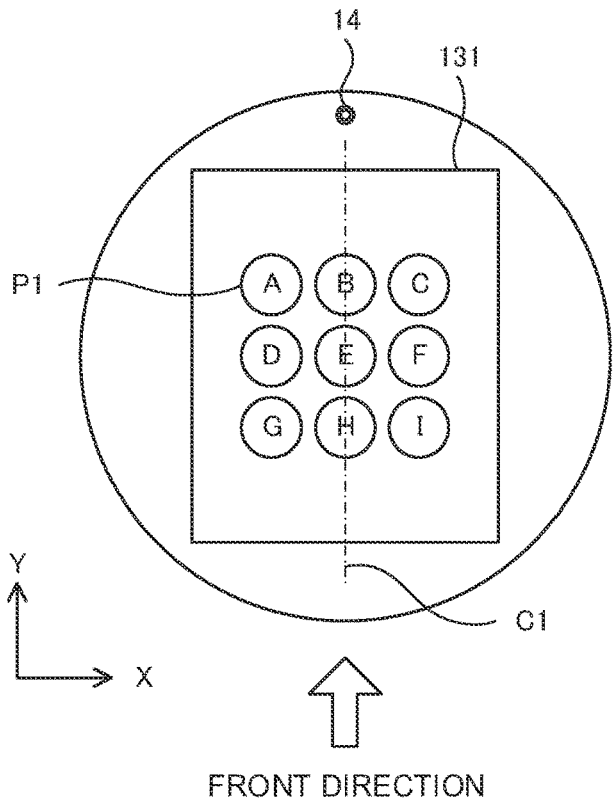
FIG. 3A is a diagram illustrating an example of an image displayed on the operating device according to the embodiment of the present invention.

As shown in FIG. 2, the operating device 1 includes a controller 11, a storage 12, an operation display 13, a camera 14, a posture detection sensor 15, a communicator 16 and the like. The operating device 1 may be an information processing device such as a smartphone or a tablet terminal. Further, various processes executed by the operating device 1 may be distributed and executed by one or a plurality of processors. FIG. 3A shows an appearance of the operating device 1. The operating device 1 has, for example, a disc-shaped outer shape.

The communicator 16 is a communication interface for connecting the operating device 1 to the communication network N1 in a wired or wireless manner to execute data communication in accordance with a predetermined communication protocol with an external device such as the display device 2 via the communication network N1.

The camera 14 is a digital camera that captures an image of a subject and outputs it as digital image data.

The posture detection sensor 15 is a sensor that detects the posture of the operating device 1, and is a gyro sensor, an acceleration sensor, a geomagnetic sensor, or the like. For example, the posture detection sensor 15 detects a posture change such as rotation and inclination of the operating device 1 and outputs a detection signal to the controller 11. Further, the posture detection sensor 15 detects coordinates and inclination of the operating device 1 in XYZ directions and outputs the detection signal to the controller 11.

The operation display 13 is a user interface including a display such as a liquid crystal display or an organic EL display that displays various types of information and an operator such as a touch panel that receives user, s operations. The operation display 13 includes the predetermined display area 131 and displays information in the display area 131. As shown in FIG. 3A, the display area 131 is formed having a rectangular shape (rectangular shape), for example. The shape of the display area 131 is not limited. Image angle information (aspect ratio, for example) corresponding to the shape of the display area 131 is stored in the storage 12.

In the example shown in FIG. 3A, nine function icons P1 are displayed in the display area 131. Each function icon P1 includes identification information for identifying the function icon P1 such as a content and a type of the function, and background image information. The function icons P1 shown in FIG. 3A include text information of "A" to "I" as the identification information. The identification information and the background image information are examples of the object information of the present invention. The shape of each function icon P1 is not limited to a circle, but may be a rectangle. Further, the nine function icons P1 are displayed in a 3×3 arrangement in the X direction (row direction) and the Y direction (column direction).

The storage 12 is a non-volatile storage including a hard disk drive (HDD), a solid state drive (SSD), or a flash memory that stores various types of information. Data such as the function icon P1 displayed on the operation display 13 is stored in the storage 12.

Further, the storage 12 stores therein a control program such as a display control program for causing the controller 11 to execute a display control processing (see FIG. 5) which will be described later. For example, the display control program is recorded non-temporarily in a computer-readable recording medium such as a USB, a CD, or a DVD, read by a reading device (not illustrated) such as a USB drive, a CD drive, or a DVD drive electrically connected to the operating device 1, and stored in the storage 12. Further, the display control program may be downloaded from a server accessible from the operating device 1 and may be stored in the storage 12.

The controller 11 includes control devices such as a CPU, a ROM, and a RAM. The CPU is a processor that executes various types of arithmetic processes. The ROM is a non-volatile storage in which a control program such as BIOS and OS for causing the CPU to execute various types of arithmetic processes is stored in advance. The RAM is a volatile or non-volatile storage that stores various types of information, and is used as a temporary storage memory (working area) for various types of processes executed by the CPU. Then, the controller 11 controls the operating device 1 by executing various control programs stored in advance in the ROM or the storage 12 on the CPU.

Specifically, as shown in FIG. 2, the controller 11 includes various processors such as a display processor 111, a posture setter 112, a posture detector 113, a display changer 114, and an operation outputter 115. The controller 11 executes various processes in accordance with the display control program on the CPU so as to function as the display processor 111, the posture setter 112, the posture detector 113, the display changer 114, and the operation outputter 115. Furthermore, some or all of the processors included in the controller 11 may be configured by an electronic circuit. The display control program may be a program for causing a plurality of processors to function as the various types of processors.

The display processor 111 causes various types of information to be displayed on the operation display 13. For example, when a dedicated application for operating the operation target image 3 displayed on the display device 2 is installed in the operating device 1, the display processor 111 causes the operation display 13 to display the function icon P1 when the user performs an operation to start the dedicated application. The display processor 111 is an example of a display processor according to the present invention.

The posture setter 112 sets the posture of the operating device 1 to a facing posture (first posture of the present invention) in which the operating device 1 faces the user. Specifically, the camera 14 captures images of the user and a surrounding environment such as a ceiling, a floor, and a wall around the user, and the posture setter 112 registers the posture (facing posture) of the operating device 1 at a position where the user faces the operating device 1, that is, the position where the user is in front of the operating device 1 on the basis of the captured image acquired from the camera 14. For example, the posture setter 112 acquires and registers the coordinates and inclination of the operating device 1 in the facing posture in the XYZ directions from the posture detection sensor 15.

Here, when the facing posture of the operating device 1 is set by the posture setter 112, the display processor 111 causes the function icon P1 to be displayed toward a predetermined direction corresponding to the facing posture. For example, as shown in FIG. 3A, the display processor 111 causes the function icon P1 to be displayed toward the front direction (an example of the first direction of the present invention) from the user toward the operating device 1. That is, as shown in FIG. 3A, when the operating device 1 is set to the facing posture, the text information "A" to "I" and the background image information of each function icon P1 are displayed toward the front direction. The posture setter 112 is an example of the posture setter of the present invention.

The posture detector 113 detects a posture change of the operating device 1 when the user changes the posture of the operating device 1. Specifically, the posture detector 113 detects the posture change of the operating device 1 on the basis of the detection signal acquired from the posture detection sensor 15. The posture detector 113 is an example of the posture detector of the present invention.

For example, as shown in FIG. 1, when the user wants to change the direction of the operation target image 3 displayed on the display device 2, he/she grasps the operating device 1 and rotates it in the right direction D1 or the left direction D2. The display direction of the operation target image 3 is changed in accordance with movement of the operating device 1.

Figure 3B:
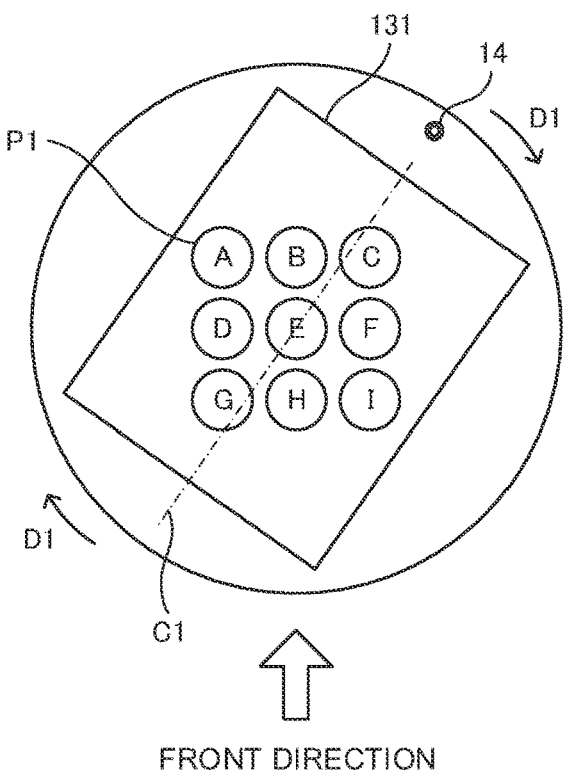
FIG. 3B is a diagram illustrating an example of an image displayed on the operating device according to the embodiment of the present invention.

Here, as shown in FIG. 3B, for example, when the user rotates the operating device 1 in the right direction D1, the direction of a center axis C1 of the operating device 1 rotates from the front direction to the right direction D1. In this case, the posture detector 113 detects the posture change (right rotation) of the operating device 1 on the basis of the detection signal acquired from the posture detection sensor 15.

Figure 3C:
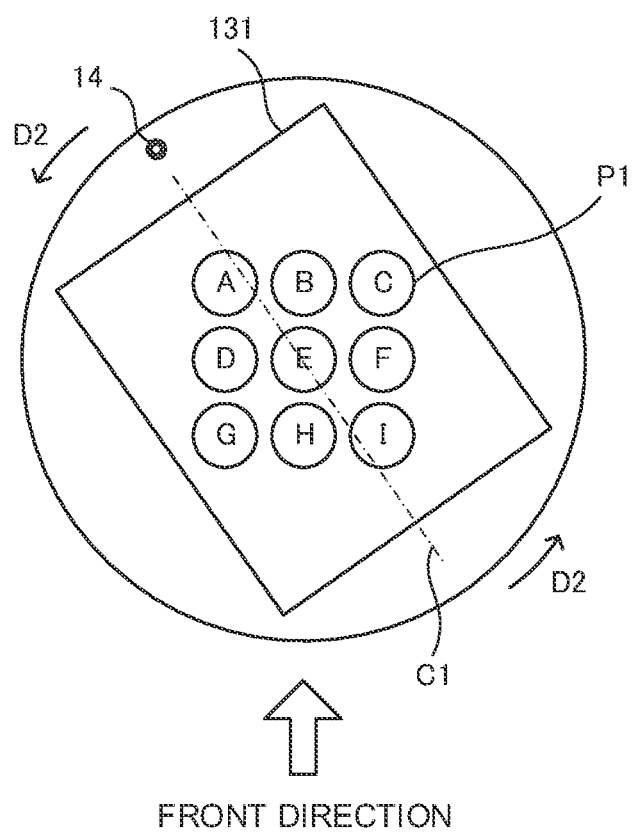
FIG. 3C is a diagram illustrating an example of an image displayed on the operating device according to the embodiment of the present invention.

When the operating device 1 changes its posture from the facing posture, the display changer 114 causes at least a part of the object information (text information, background image information) included in the function icon P1 to be displayed toward the front direction in the display area 131. The display changer 114 is an example of the display changer of the present invention. Specifically, as shown in FIG. 3B, the display changer 114 causes the function icons P1 to be displayed toward the front direction in the display area 131 having been rotated in the right direction D1. Further, as shown in FIG. 3C, the display changer 114 causes the function icons P1 to be displayed toward the front direction in the display area 131 having been rotated in the left direction D2. For example, the display changer 114 causes the text information ($A_R$ to $I_R$) and the background image information of the function icons P1 to be displayed toward the front direction in the display area 131 (see FIGS. 3B and 3C). The posture of the operating device 1 shown in FIGS. 3B and 3C is an example of the second posture of the present invention.

Further, the display changer 114 causes an icon group (object group of the present invention) including a plurality of the function icons P1 to be displayed toward the front direction in the display area 131. That is, when the operating device 1 changes its posture from the facing posture, the display changer 114 causes the icon group to be displayed in the display area 131 while maintaining the display direction of the icon group in the front direction.

As described above, the display changer 114 causes the function icons P1 to be displayed so that the display position, arrangement, and orientation of the text information as seen by the user do not change when the operating device 1 is rotated. As a result, the appearance of the function icons P1 as seen by the user does not change (fixed), so that the visibility of the function icons P1 can be improved. For example, the display changer 114 may display the text information of the function icons P1 toward the front direction in the display area 131, and may display the background image information toward the rotation direction side (an example of the second direction of the present invention). For example, when the background image represents an outer shape of the function icon P1, the display changer 114 may rotate the function icon P1 with the rotation of the operating device 1 while fixing its display position (coordinates).

Figure 4A:
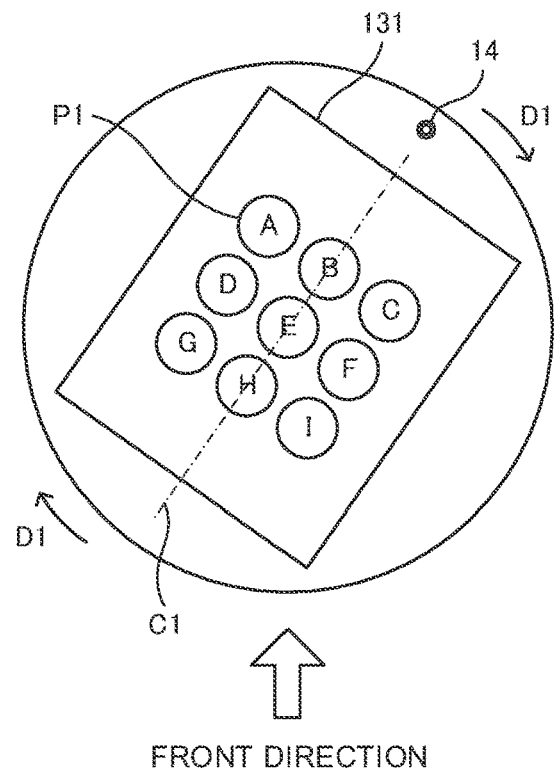
FIG. 4A is a diagram illustrating an example of an image displayed on the operating device according to the embodiment of the present invention.
Figure 4B:
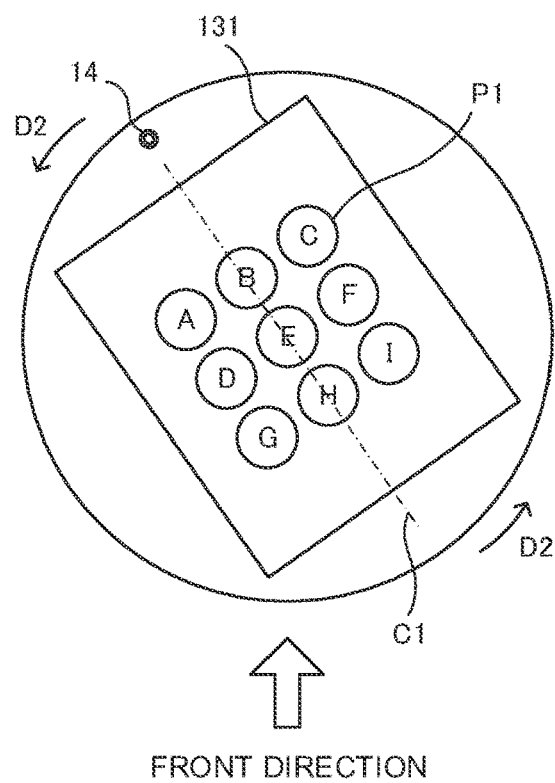
FIG. 4B is a diagram illustrating an example of an image displayed on the operating device according to the embodiment of the present invention.

As another embodiment, the display changer 114 may display the function icons P1 at the display positions (coordinates) of the function icons P1 with respect to the display area 131 in the facing posture when the operating device 1 changes its posture from the facing posture. Specifically, as shown in FIG. 4A, the display changer 114 causes the function icons P1 to be displayed in the display area 131 having been rotated in the right direction D1 by shifting its display positions to the right direction D1 side. As shown in FIG. 4B, the display changer 114 causes the function icons P1 to be displayed in the display area 131 having been rotated in the left direction D2 by shifting the display positions to the left direction D2 side. In this case, the display changer 114 causes the text information ($A_R$ to $I_R$) and the background image information of the function icons P1 to be displayed toward the front direction in the display area 131 (see FIGS. 4A and 4B).

Further, the display changer 114 causes an icon group including the plurality of function icons P1 to be displayed toward a direction of the center axis C1 having been rotated and moved (an example of the second direction in the present invention) in the display area 131 (see FIGS. 4A and 4B). The display changer 114 rotates the entire icon group. That is, when the operating device 1 changes its posture from the facing posture, the display changer 114 causes the icon group to be displayed toward the direction of the center axis C1 in the display area 131, and causes the text information of at least one function icon P1 included in the icon group to be displayed toward the front direction.

As described above, when the operating device 1 is rotated, the display changer 114 changes the display position of the function icon P1 in accordance with the posture change of the operating device 1, while the function icon P1 is displayed so that the direction of the text information does not change. As a result, the text information of the function icon P1 is displayed toward the front direction while the relative positions between the user's finger and the function icon P1 are maintained, so that the operability and visibility of the function icon P1 can be improved. For example, the display changer 114 may display the text information and the background image information of the function icon P1 in the display area 131 toward the front direction.

The operation outputter 115 outputs a first operation instruction to cause the posture of the operation target image 3 to be changed in accordance with a change amount of the posture change of the operating device 1. Specifically, when the user rotates the operating device 1 only by a predetermined angle, the operation outputter 115 outputs the first operation instruction including information (posture information) such as a rotation angle, an inclination angle, and coordinates acquired from the posture detection sensor 15 to the display device 2.

Further, when the function icon P1 displayed in the display area 131 is selected by the user, the operation outputter 115 outputs a second operation instruction to cause the process corresponding to the selected function icon P1 to be executed. For example, when the user selects the function icon P1 for designating a color, the operation outputter 115 outputs the second operation instruction to cause the display color of the operation target image 3 to be changed to the color designated by the user to the display device 2.

Display Device 2

As illustrated in FIG. 2, the display device 2 includes a controller 21, a storage 22, a display 23, a communicator 24, and the like. The display device 2 may be an information processing device such as a personal computer.

The communicator 24 is a communication interface that connects the display device 2 to the communication network N1 by wire or wirelessly, and executes data communication with an external device such as the operating device 1 via the communication network N1 in accordance with a predetermined communication protocol.

The display 23 is a liquid crystal display or an organic EL display that displays various types of information. The display 23 displays, for example, the object image 3. The display device 2 may include an operator (not shown) such as a mouse, a keyboard, or a touch panel that receives various operations.

The storage 22 is a non-volatile storage such as an HDD, an SSD, or a flash memory that stores various types of information. The storage 22 stores data such as the operation target image 3 (see FIG. 1) displayed on the display 23.

Further, the storage 22 stores a control program for causing the controller 21 to execute various control processes. For example, the control program is non-temporarily recorded in a computer-readable recording medium such as a USB, a CD, or a DVD, read by a reading device (not illustrated) such as a USB drive, a CD drive, or a DVD drive electrically connected to the display device 2, and stored in the storage 22. Further, the control program may be downloaded from a server accessible from the display device 2 and stored in the storage 22.

The controller 21 includes control devices such as a CPU, a ROM, and a RAM. The CPU is a processor that executes various types of arithmetic processes. The ROM is a non-volatile storage in which a control program such as BIOS and OS for causing the CPU to execute various types of processes is stored in advance. The RAM is a volatile or non-volatile storage that stores various types of information, and is used as a temporary storage memory (working area) for various types of processes executed by the CPU. The controller 21 controls the display device 2 by causing the CPU to execute various types of control programs stored in advance in the ROM or the storage 22.

Specifically, as shown in FIG. 2, the controller 21 includes various processors such as a display processor 211 and an operation controller 212. The controller 21 functions as the display processor 211 and the operation controller 212 by executing various processes in accordance with the control program on the CPU. Furthermore, some or all of the processors included in the controller 21 may be configured by an electronic circuit. The control program may be a program for causing a plurality of processors to function as the various processors.

The display processor 211 causes the display 23 to display various types of information. For example, the display processor 211 causes the display 23 to display the operation target image 3 (see FIG. 1).

The operation controller 212 receives an operation instruction (first operation instruction, second operation instruction) from the operating device 1 and executes the process in response to the operation instruction with respect to the operation target image 3 displayed on the display 23.

For example, when the user rotates the operating device 1 only by a predetermined angle, the operation outputter 115 of the operating device 1 outputs the first operation instruction including information such as a rotation angle, an inclination angle, and coordinates (posture information) acquired from the posture detection sensor 15 to the display device 2. Upon receipt of the first operation instruction, the operation controller 212 changes the rotation angle, inclination angle, coordinates, and the like of the operation target image 3 on the basis of the posture information. For example, as shown in FIG. 3B, when the user rotates the operating device 1 in the right direction D1 only by a predetermined angle, the operation controller 212 rotates the operation target image 3 in the right direction D1 only by a predetermined angle and displays it.

Further, for example, when the user selects the function icon P1 for designating a color in the operating device 1, the operation outputter 115 of the operating device 1 outputs the second operation instruction to change the display color of the operation target image 3 to the color designated by the user to the display device 2. Upon receipt of the second operation instruction, the operation controller 212 changes the display color of the operation target image 3 to the color designated by the user.

Display Control Process

Figure 5:
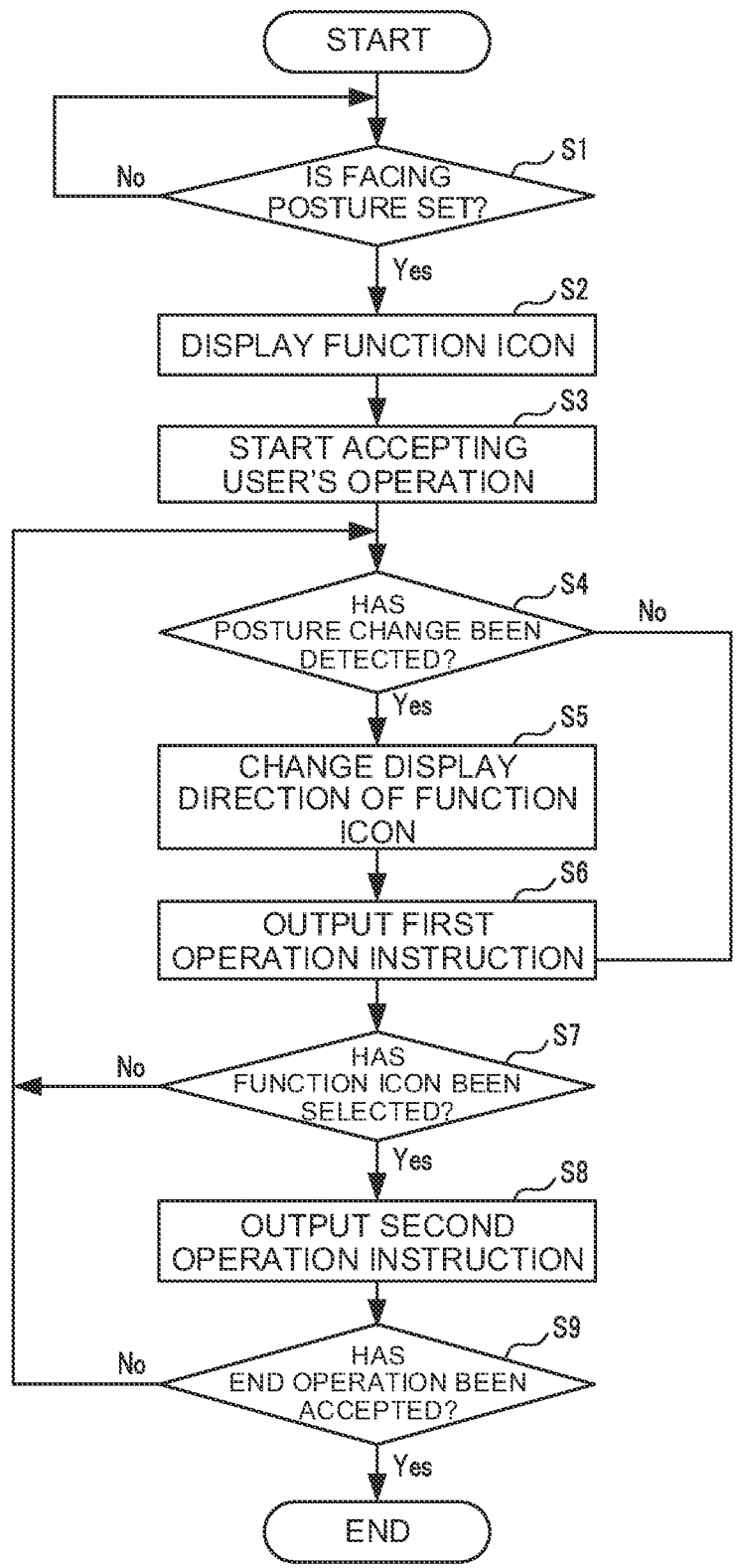
FIG. 5 is a flowchart illustrating an example of a procedure of display control processing executed by the operating device according to the embodiment of the present invention.

Next, the display control process executed in the display control system 100 will be described with reference to FIG. 5. Specifically, in the present embodiment, the display control process is executed by the controller 11 of the operating device 1. The controller 11 may end the display control process in the middle by a predetermined operation of the operating device 1.

The present invention can be regarded as an invention of a display control method (an example of the display control method of the present invention) for executing one or a plurality of steps included in the display control process. Further, one or more steps included in the display control process described herein may be omitted where appropriate. In addition, each of the steps in the display control process may be executed in a different order as long as a similar operation and effect are obtained. Further, although a case where each of the steps in the display control process is executed by the controller 11 will be described as an example here, a display control method in which each of the steps in the display control process is executed in a distributed manner by a plurality of processors may be regarded as another embodiment.

Here, the operating device 1 can operate the operation target image 3 displayed on the display device 2 by starting the dedicated application.

First, at step S1, the controller 11 determines whether or not the posture of the operating device 1 is set to the facing posture (front direction). Specifically, the controller 11 starts the dedicated application and sets the posture of the operating device 1 at a position in front of the operating device 1 to the facing posture.

For example, the controller 11 sets the facing posture on the basis of the captured image (the image of the surrounding environment including the user) acquired from the camera 14.

When the facing posture of the operating device 1 is set (S1: Yes), the process proceeds to step S2. The controller 11 waits until the facing posture of the operating device 1 is set (S1: No). Step S1 is an example of the posture setting step of the present invention.

At step S2, the controller 11 causes the function icon P1 to be displayed toward a predetermined direction corresponding to the facing posture in the display area 131 of the operating device 1. For example, as shown in FIG. 3A, the controller 11 displays the function icon P1 toward the front direction from the user to the operating device 1. Step S2 is an example of a display step according to the present invention.

At step S3, the controller 11 starts receiving the user's operation to the operating device 1.

At step S4, the controller 11 determines whether or not the posture change of the operating device 1 has been detected. Specifically, the controller 11 detects the presence or absence of a posture change of the operating device 1 on the basis of the detection signal acquired from the posture detection sensor 15. For example, as shown in FIG. 3B, when the user rotates the operating device 1 in the right direction D1, the controller 11 detects the posture change of the operating device 1 (rotation to the right) on the basis of the detection signal acquired from the posture detection sensor 15. When the controller 11 detects the posture change of the operating device 1 (S4: Yes), the process proceeds to step S5. On the other hand, when the controller 11 does not detect the posture change of the operating device 1 (S4: No), the process proceeds to step S7. Step S4 is an example of the posture detecting step of the present invention.

At step S5, the controller 11 displays at least a part of the object information (text information, background image information) included in the function icon P1 toward the front direction. Specifically, as shown in FIG. 3B, when the operating device 1 is rotated in the right direction D1, the controller 11 directs the function icon P1 toward the front direction in the display area 131 having been rotated in the right direction D1. Further, specifically, as shown in FIG. 3C, when the operating device 1 is rotated in the left direction D2, the controller 11 causes the function icon P1 to be displayed toward the front direction in the display area 131 having been rotated in the right direction D2. For example, the controller 11 causes the text information ("A" to "I") of the function icon P1 and the background image information to be displayed toward the front direction in the display area 131 (see FIGS. 3B and 3C). In this way, the controller 11 fixes the display state of the function icon P1 as seen by the user regardless of the posture change of the operating device 1. Step S5 is an example of a display change step according to the present invention.

For example, if the operating device 1 is rotated while the user is performing an operation of selecting the function icon P1, if the position of the function icon P1 with respect to the display area 131 is changed, it may become difficult for the user to select the function icon P1. Therefore, the controller 11 may be configured such that the position of the function icon P1 with respect to the display area 131 is not changed when the posture change of the operating device 1 is detected while the user is selecting the function icon P1. That is, the controller 11 causes the display position of the function icon P1 to be changed with the posture change of the operating device 1. As a result, since the relative positional relationship between the user's finger and the function icon P1 can be maintained, deterioration of the operability of the function icon P1 can be prevented.

At step S6, the controller 11 outputs the first operation instruction to change the posture of the operation target image 3 in accordance with the change amount of the posture change of the operating device 1. For example, when the user rotates the operating device 1 in the right direction D1 only by a predetermined angle, the controller 11 outputs the first operation instruction including rotation angle information (posture information) acquired from the posture detection sensor 15 to the display device 2. Upon receipt of the first operation instruction, the display device 2 rotates the operation target image 3 in the right direction D1 only by a predetermined angle.

At step S7, the controller 11 determines whether or not the operation of selecting the function icon P1 has been received from the user. If the operation of selecting the function icon P1 has been received from the user (S7: Yes), the process proceeds to step S8. If the operation of selecting the function icon P1 is not received from the user (S7: No), the process proceeds to step S4.

At step S8, the controller 11 outputs a second operation instruction to cause the process corresponding to the selected function icon P1 to be executed to the display device 2. For example, when the user selects the function icon P1 for designating a color, the controller 11 outputs the second operation instruction to cause the display color of the operation target image 3 to be changed to the color designated by the user to the display device 2. Upon receipt of the second operation instruction, the display device 2 changes the display color of the operation target image 3 to the color designated by the user.

At step S9, the controller 11 determines whether or not an end operation has been received from the user. If the end operation has been received from the user (S9: Yes), the process ends. If the end operation is not received from the user (S9: No), the process proceeds to step S4. The controller 11 repeats the processes of steps S4 to S8 until the end operation is received from the user. As described above, the controller 11 executes the display control process.

As described above, the operating device 1 according to the present embodiment is a controller including the operation display 13 including the predetermined display area 131, and capable of executing a predetermined process in accordance with the user's operation. Further, the operating device 1 sets the posture of the operating device 1 with respect to the user to the facing posture (front direction) and causes the function icon P1 to be displayed toward the facing direction (front direction) in the display area 131 of the operating device 1 set to the facing posture. Further, the operating device 1 detects the posture change of the operating device 1 when the user changes the posture of the operating device 1, and when the operating device 1 changes the posture from a first posture to a second posture, the operating device 1 causes at least a part of the object information (text information, background image information) included in the function icon P1 to be displayed toward the front direction in the display area 131. According to this configuration, when the posture of the operating device 1 changes, even if the operating device 1 rotates, for example, the direction of the text information of the function icon P1 is fixed to the user's direction, for example, and thus, the visibility of the function icon P1 can be improved.

The present invention is not limited to the above-described embodiment. Other embodiments of the present invention will be described below.

Figure 6A:
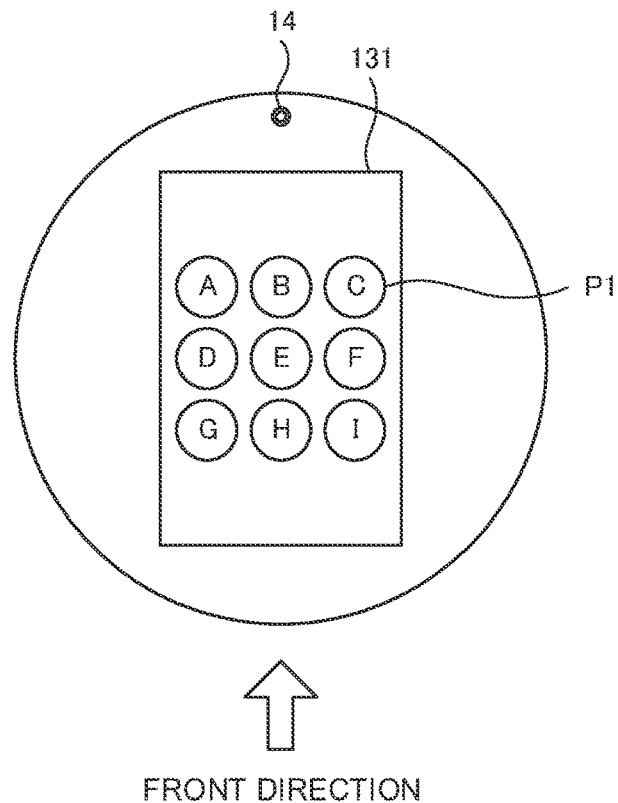
FIG. 6A is a diagram illustrating an example of an image displayed on the operating device according to the embodiment of the present invention.
Figure 6B:
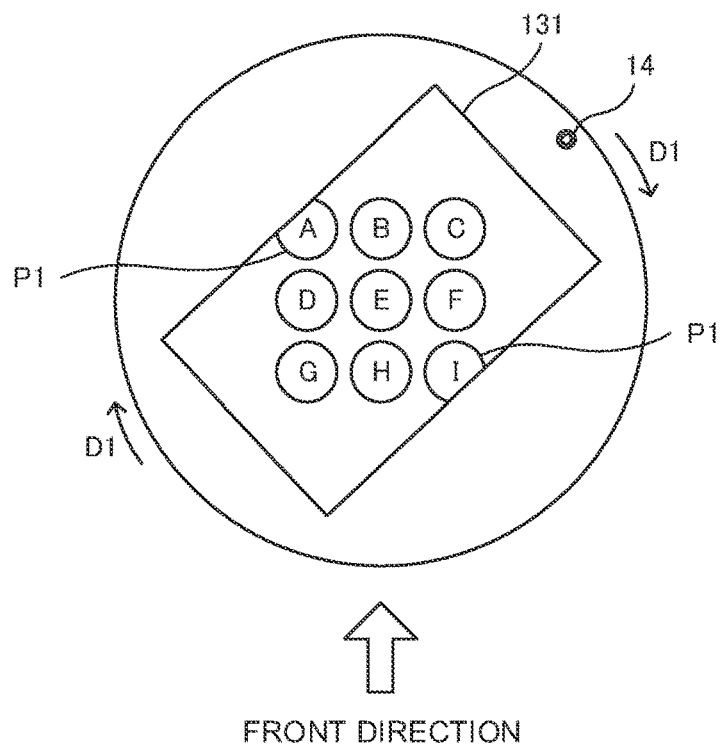
FIG. 6B is a diagram illustrating an example of an image displayed on the operating device according to the embodiment of the present invention.

For example, in the embodiment shown in FIGS. 3B and 3C, when the operating device 1 changes its posture (for example, rotates), the relative positional relationship between the function icon P1 and the display area 131 is deviated. Therefore, when the operating device 1 changes its posture (rotates), all or a part of one function icons P1 may not fit in the display area 131. Further, when the operating device 1 changes its posture (rotates), all or a part of the icon group including the plurality of function icons P1 may not fit in the display area 131. This problem can occur when the direction of the shape of the display area 131 viewed from the front direction changes when the operating device 1 changes its posture (rotates). For example, when the shape of the display area 131 is rectangular (see FIG. 6A) and the operating device 1 changes its posture (rotates), as shown in FIG. 6B, the direction of the rectangular display area 131 (rectangle) viewed from the front direction may change to a diagonal direction, and a part of the function icons P1 may not fit in the display area 131. In the example shown in FIG. 6B, a part of the function icons P1 of "A" and "I" does not fit in the display area 131 and is interrupted.

Therefore, as another embodiment of the present invention, when the operating device 1 changes its posture from the first posture (facing posture) to the second posture, whereby at least a part of the function icons P1 does not fit in the display area 131, the display changer 114 changes the display position of the function icon P1 so that the function icon P1 is displayed in the display area 131. Further, when the operating device 1 changes its posture from the facing posture to the second posture, whereby the first function icon P1 included in the icon group (an example of the first object of the present invention) is not fitted in the display area 131, the display changer 114 cancels the arrangement state (arrangement direction) of the plurality of function icons P1 included in the icon group and causes the first function icon P1 to be displayed in the display area 131.

Figure 6C:
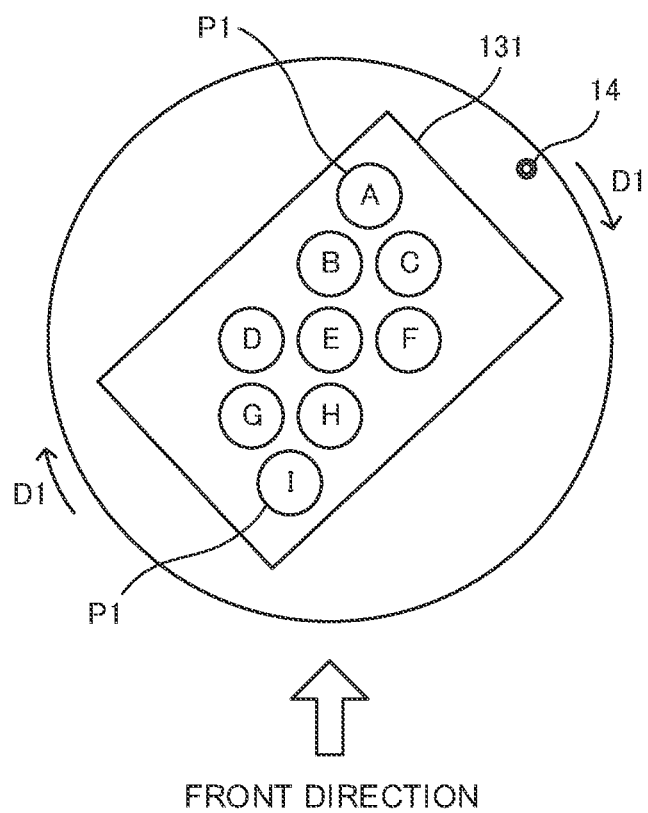
FIG. 6C is a diagram illustrating an example of an image displayed on the operating device according to the embodiment of the present invention.

For example, as shown in FIG. 6C, the display changer 114 changes the display positions of the function icons P1 of "A" and "I" so that they are displayed so as to fit in the display area 131. The display changer 114 may cancel the arrangement state of the nine function icons P1 and rearrange them so that all the nine function icons P1 are displayed in the display area 131.

As another embodiment of the present invention, the display changer 114 may change the display position of the function icon P1 when the operating device 1 changes its posture from the facing posture to the second posture. For example, the display changer 114 cancels the arrangement state (arrangement direction) of the plurality of function icons P1 included in the icon group when the operating device 1 changes its posture from the facing posture to the second posture and causes one or a plurality of function icons P1 to be displayed (rearranged) in the display area 131. For example, when the operating device 1 is rotated to the position shown in FIG. 3B, even if the function icons P1 of "A" and "I" are contained in the display area 131, the display positions of the function icons P1 of "A" and "I" are changed. In this way, by changing the arrangement state of the group icons in accordance with the posture change of the operating device 1, the entire group icons can be made easier to be seen.

Figure 7A:
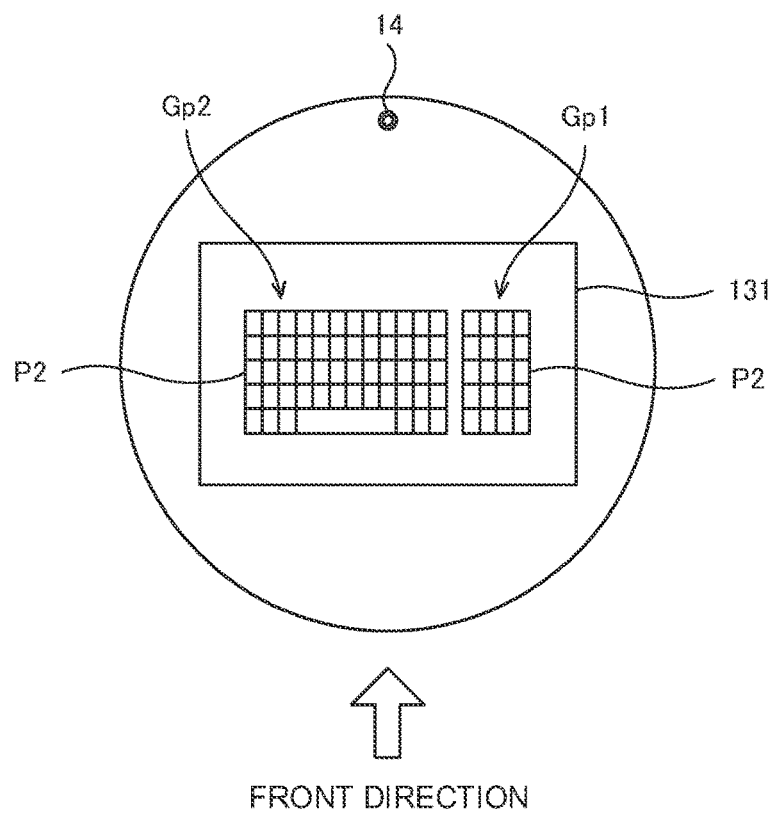
FIG. 7A is a diagram illustrating an example of an image displayed on the operating device according to the embodiment of the present invention.

Further, as another embodiment of the present invention, the object displayed in the display area 131 may be an operation icon P2 such as a keyboard, as shown in FIG. 7A. Each key on the keyboard corresponds to the operation icon P2. In the example shown in FIG. 7A, a group icon Gp1 composed of the operation icons P2 of the ten keys (numeric keys) and a group icon Gp2 composed of the operation icons P2 of the character keys are shown. Here, for example, when the user rotates the operating device 1 in the right direction D1, the display changer 114 maintains the key layout of the group icon Gp1 and the key layout of the group icon Gp2 and displays each operation icon P2 (each key) toward the front direction.

Figure 7B:
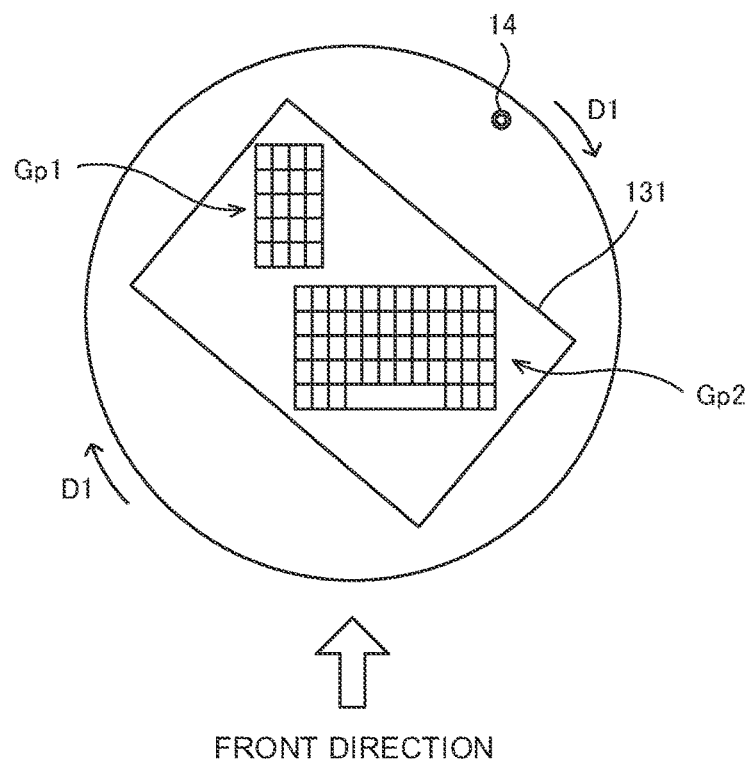
FIG. 7B is a diagram illustrating an example of an image displayed on the operating device according to the embodiment of the present invention.

Further, when at least a part of the operation icons P2 does not fit in the display area 131 due to the posture change of the operating device 1 from the first posture (facing posture) to the second posture, the display changer 114 causes the display positions of the group icon Gp1 and the group icon Gp2 to be displayed so that they are displayed so as to fit within the display area 131 as shown in FIG. 7B. As shown in FIG. 7C, the display changer 114 changes the display positions of the group icon Gp1 and the group icon Gp2 in accordance with the posture change of the operating device 1. As a result, each operation icon P2 can be displayed in the display area 131 while maintaining the key layout, and each operation icon P2 can be displayed toward the front direction.

In the above-described embodiment, the posture setter 112 sets the posture of the operating device 1 to the facing posture in which the operating device 1 faces the user on the basis of the captured image acquired from the camera 14. The method of setting the facing posture is not limited to the above method using the camera 14. As another embodiment, the posture setter 112 may set the posture of the operating device 1 to the facing posture when the user presses a calibration button (not shown) provided on the operating device 1. For example, the user grips the operating device 1 and positions the operating device 1 so that it faces the front direction of himself/herself. After that, when the user presses the calibration button, the controller 11 sets the posture of the operating device 1 at that time to the facing posture. The function of the calibration button can be replaced with a predetermined operation for the operating device 1. For example, when the user shakes the operating device 1 in a predetermined direction or touches the operation display 13 a predetermined number of times after the positioning, the controller 11 sets the posture of the operating device 1 at that time to the facing posture. When the facing posture of the operating device 1 is set by these methods, the operating device 1 does not have to include the camera 14.

Figure 8A:
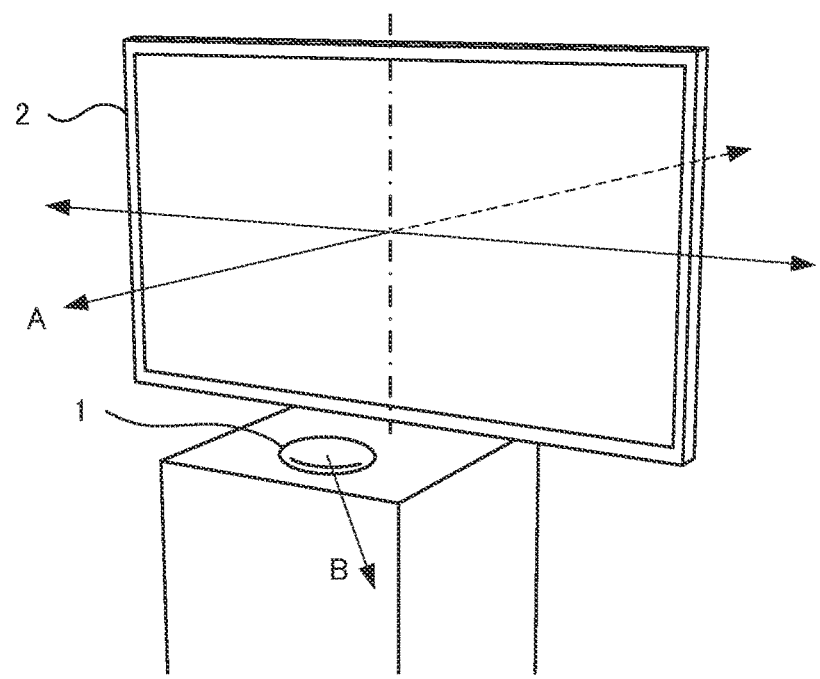
FIG. 8A is a diagram illustrating an example of a method of setting a facing posture of the operating device according to the embodiment of the present invention.

Further, the posture setter 112 may set the facing posture by using a geomagnetic sensor (compass) provided in the operating device 1. For example, as shown in FIG. 8A, the display device 2 is positioned in advance so as to face a predetermined direction A, and the operating device 1 is placed in front of the display device 2 for a predetermined time (for example, 5 seconds). Then, the posture setter 112 calculates the front direction of the operating device 1 with respect to the display device 2 on the basis of the relative relationship between an azimuth A of the display device 2 and an azimuth B (N pole) of the geomagnetic sensor. As a result, the posture setter 112 sets the posture of the operating device 1 to the facing posture.

Figure 8B:
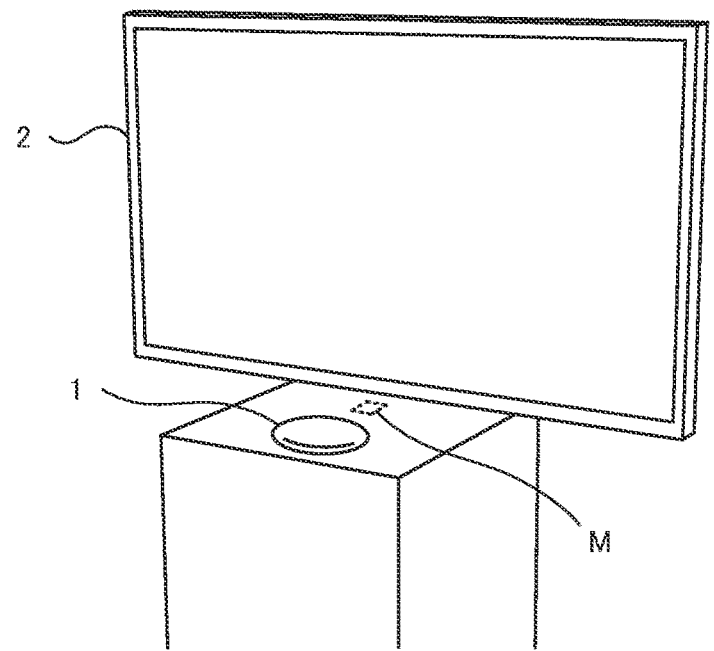
FIG. 8B is a diagram illustrating an example of the method of setting the facing posture of the operating device according to the embodiment of the present invention.

Further, the posture setter 112 may set the facing posture by using the geomagnetic sensor (compass) provided in the operating device 1 and a magnet M arranged in front of the display device 2. For example, as shown in FIG. 8B, the magnet M is arranged in front of the display device 2, and the operating device 1 is placed in front of the magnet M for a predetermined time (for example, 5 seconds). Then, the geomagnetic sensor detects the direction of the magnet M, and the posture setter 112 calculates the front direction of the operating device 1 with respect to the display device 2 on the basis of the direction detected by the geomagnetic sensor. As a result, the posture setter 112 sets the posture of the operating device 1 to the facing posture.

Figure 8C:
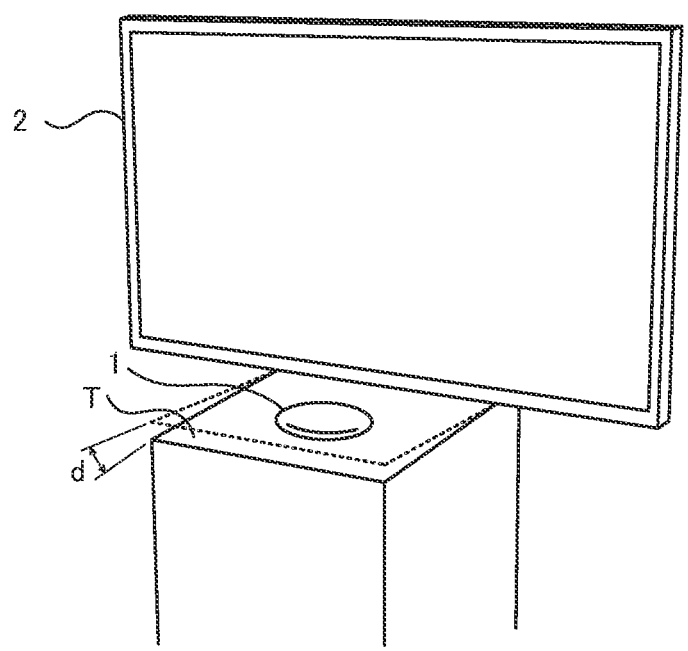
FIG. 8C is a diagram illustrating an example of the method of setting the facing posture of the operating device according to the embodiment of the present invention.

Further, the posture setter 112 may set the facing posture by using the acceleration sensor provided in the operating device 1. For example, as shown in FIG. 8C, an inclined table L that is inclined by an angle d (for example, 5 degrees) toward the display device 2 is installed in front of the display device 2, and the operating device 1 is placed on the inclined table L for a predetermined time (for example, 5 degrees). For example, 5 seconds). The dotted line in FIG. 8C represents the position of a horizontal table. Then, the acceleration sensor detects the acceleration of the X-axis, the Y-axis, and the Z-axis, and the posture setter 112 calculates the front direction of the operating device 1 with respect to the display device 2 on the basis of the acceleration detected by the acceleration sensor. As a result, the posture setter 112 sets the posture of the operating device 1 to the facing posture.

As described above, the operating device 1 can set the front direction (facing posture) of the operating device 1 by various methods. Further, the operating device 1 can set the facing posture each time the user places the operating device 1 on a predetermined place.

The operation target image, which is an example of the operation target of the present invention, may be a game image displayed by a game application on the display device 2. Further, the operation target of the present invention is not limited to the operation target image displayed on the display device 2. The operation target of the present invention may be a moving body that is communicably connected to the operating device 1 and can move in accordance with the movement of the operating device 1. The moving body may be, for example, a robot, a drone, a radio control, or the like.

Further, the operation target of the present invention may be an image displayed on the operation display 13 of the operating device 1. For example, the operating device 1 may cause the operation target image 3 to be displayed on the operation display 13 and causes the display direction of the operation target image 3 to be changed in accordance with the posture of the operating device 1. In this case, for example, the operating device 1 can be applied to a game device that causes a game image corresponding to the operation target image 3 to be displayed on the operation display 13.

The shape of the operating device of the present invention is not limited to a disc shape. Specifically, the operating device 1 may have a shape related to the operation target or a model. For example, when the operation target is an image of a car (see FIG. 1), the shape of the operating device 1 may be a model of a car or a model of a steering wheel.

The operating device of the present invention can be applied to a communication device capable of executing a communication tool. For example, the operating device 1 causes a plurality of objects corresponding to the contents of each conversation to be displayed in the display area 131. For example, the operating device 1 maintains the display direction of the object in the front direction regardless of the posture of the operating device 1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An operating device including a display including a predetermined display area and executing a predetermined process in response to a user's operation, comprising:
    a posture setter that sets a posture of the operating device with respect to the user to a first posture;
    a display processor that causes a predetermined object to be displayed toward a first direction in the display area of the operating device set to the first posture;
    a posture detector that detects a posture change of the operating device when the user changes the posture of the operating device; and
    a display changer that, when the operating device changes the posture from the first posture to a second posture, causes identification information for identifying the object included in the object to be displayed toward the first direction and causes background image information included in the object to be displayed toward a second direction corresponding to the second posture in the display area.

2. The operating device according to claim 1, wherein the display changer causes the object to be displayed at a display position of the object with respect to the display area in the first posture when the operating device changes the posture from the first posture to the second posture.

3. The operating device according to claim 1, wherein the display processor causes an object group including a plurality of the objects arranged in a predetermined direction to be displayed toward the first direction; and
    the display changer causes the object group to be displayed while a display direction of the object group is maintained to the first direction in the display area when the operating device changes the posture from the first posture to the second posture.

4. The operating device according to claim 3, wherein when a first object included in the object group does not fit in the display area due to the posture change of the operating device from the first posture to the second posture, the display changer cancels an arrangement state of a plurality of the objects included in the object group and causes the first object to be displayed in the display area.

5. The operating device according to claim 1, wherein the display processor causes an object group including a plurality of the objects arranged in a predetermined direction to be displayed toward the first direction; and
    the display changer causes the object group to be displayed toward a second direction corresponding to the second posture and causes the identification information of at least one of the objects included in the object group to be displayed toward the first direction in the display area when the operating device changes the posture from the first posture to the second posture.

6. The operating device according to claim 1, wherein when at least a part of the object does not fit in the display area due to the posture change of the operating device from the first posture to the second posture, the display changer changes the display position of the object and causes the object to be displayed in the display area.

7. The operating device according to claim 1, further comprising
    an operation outputter that can operate an operation target in response to the user's operation, and outputs a first operation instruction that causes a posture of the operation target to be changed in accordance with a change amount of the posture change of the operating device.

8. The operating device according to claim 7, wherein the object is a function icon that causes a predetermined process to be executed to the operation target; and
    the operation outputter outputs a second operation instruction that causes the predetermined process to be executed when the object is selected by the user.

9. The operating device according to claim 7, wherein the operation target is an operation target image displayed on a display device communicably connected to the operating device.

10. A display control method for displaying an image in a display area included in a display of an operating device that executes a predetermined process in response to a user's operation and executing by one or a plurality of processors:
    setting a posture of the operating device with respect to the user to a first posture;
    displaying a predetermined object toward a first direction in the display area of the operating device set to the first posture;
    detecting a posture change of the operating device when the user changes the posture of the operating device; and
    when the operating device changes the posture from the first posture to a second posture, causing identification information for identifying the object included in the object to be displayed toward the first direction and causing background image information included in the object to be displayed toward a second direction corresponding to the second posture in the display area.

11. A non-transitory computer-readable recording medium that records a display control program that causes an image to be displayed in a display area included in a display of an operating device that executes a predetermined process in response to a user's operation and causes a computer to execute by one or a plurality of processors:
    setting a posture of the operating device with respect to the user to a first posture;
    displaying a predetermined object toward a first direction in the display area of the operating device set to the first posture;
    detecting a posture change of the operating device when the user changes the posture of the operating device; and when the operating device changes the posture from the first posture to a second posture, causing identification information for identifying the object included in the object to be displayed toward the first direction and causing background image information included in the object to be displayed toward a second direction corresponding to the second posture in the display area.

\* \* \* \* \*